US012673434B2

(12) United States Patent
Huang

(10) Patent No.: US 12,673,434 B2
(45) Date of Patent: Jul. 7, 2026

(54) TOOL HOLDER

(71) Applicant: SHIP AND OCEAN INDUSTRIES R&D CENTER, New Taipei City (TW)

(72) Inventor: Chun-Chia Huang, New Taipei City (TW)

(73) Assignee: SHIP AND OCEAN INDUSTRIES R&D CENTER, New Taipei City (TW)

( * ) Notice: Subject to any disclaimer, the term of this patent is extended or adjusted under 35 U.S.C. 154(b) by 872 days.

(21) Appl. No.: 18/083,521

(22) Filed: Dec. 17, 2022

(65) Prior Publication Data

US 2024/0198540 A1 Jun. 20, 2024

(30) Foreign Application Priority Data

Dec. 14, 2022 (TW) .................................. 111147975

(51) Int. Cl.
B25J 15/04 (2006.01)
B23Q 5/10 (2006.01)
(52) U.S. Cl.
CPC ............ B25J 15/0475 (2013.01); B23Q 5/10 (2013.01); *Y10T 483/1786* (2015.01)
(58) Field of Classification Search
CPC ............................... B25J 15/0475; B23Q 5/10
See application file for complete search history.

(56) References Cited

U.S. PATENT DOCUMENTS

| | | | | |
|---|---|---|---|---|
| 4,658,485 | A | * | 4/1987 | Yang ...................... B23Q 1/012 |
| | | | | 451/340 |
| 4,981,057 | A | * | 1/1991 | von Haas ............ B23B 31/1071 |
| | | | | 82/158 |
| 5,090,226 | A | * | 2/1992 | Takeoka ............... B21D 41/023 |
| | | | | 72/125 |
| 9,604,332 | B2 | * | 3/2017 | Honegger ................ B23Q 1/34 |
| 2011/0233839 | A1 | | 9/2011 | Haimer |
| 2019/0160612 | A1 | | 5/2019 | Schanz |

FOREIGN PATENT DOCUMENTS

| | | | |
|---|---|---|---|
| CN | 1343540 A | 4/2002 | |
| CN | 110216298 A * | 9/2019 | .............. B23Q 1/00 |
| CN | 114406869 A | 4/2022 | |
| TW | 200812734 A | 3/2008 | |

* cited by examiner

*Primary Examiner* — Thomas E Lazo
(74) *Attorney, Agent, or Firm* — Cheng-Ju Chiang

(57) ABSTRACT

The present invention discloses a tool holder. Specifically, the tool holder comprises an executing end and a tool end. The executing end comprises a linear motion module and a rotating motion module. Furthermore, a first clutch and a second clutch are used for switching the operating mode therebetween the linear motion module and the rotating motion module. Hence, the present invention can provide different operating modes in a single executing end to the tool end.

12 Claims, 8 Drawing Sheets

<u>10</u>

100

1071

108

2071        207

TOOL HOLDER

TECHNICAL FIELD

The present invention relates to a tool holder. Specifically, the tool holder may switch different motion modes via a single holder which provides different control modes for the tool end of the tool holder.

BACKGROUND

The concept of the magazine has been widely used in several kinds of the machine tools. The commercial machine tool may grip force for gripping the tools via the air pressure. However, the aforementioned mechanisms are also usually used in the robotic arms, such as the switching of cutter, tools or jigs.

Overall, the commercial tool switching method are mostly accomplished manually. Furthermore, the functional tools are actuated via the built-in actuators per se. However, considering the variety of needs of the production lines, tasks and requirements, the related machines such as the robotic arms which are unable to quickly switch the tools at the end per se have been unacceptable nowadays.

Thereby, the present machine tools may be designed to accommodate for different tools at the end of the robotic arm simultaneously, but the abovementioned designs of those robotic arms often require complex and precious mechanical designs which may result in the reason of slow tool switching. Hence, the cost of time and energy thereon the tool switching are also increase, thus to significantly increase the cost of the production line at the same time, too.

SUMMARY OF INVENTION

In order to solve the problem of the prior art, the purpose of the present invention is to provide a tool holder. Specifically, the tool holder of the present invention comprises a holder and a tool end.

The holder comprises at least one positioning pin, a motor, a transmission module, a first clutch, a linear motion module, a second clutch and a rotational motion module. The at least one positioning pin is configured at the end of the holder, and the motor is configured in the holder. Moreover, the transmission module connects to the motor, and the first clutch detachably engages with the transmission module. On the other hand, the second clutch detachably engages with the transmission module, too.

Thereafter, the linear motion module detachably engages with the first clutch, and the linear motion module comprises at least one linear motion connector. The rotational motion module detachably engages with the second clutch, and the rotational motion module comprises the at least one rotational connector.

The tool end detachably connects to the holder. Specifically, the tool end comprises at least one positioning slot, an engaged portion, an idling portion and a working portion. The at least one positioning slot is matches with the at least one positioning pin. The engaged portion alternatively connects with the at least one linear motion connector or the at least one rotational connector.

Furthermore, the idling portion alternatively holds the at least one linear motion connector or the at least one rotational connector which has not been connected with the engaged portion, and the working portion is connected with the engaged portion.

Embodiments of the invention are illustrated by way of example, and not by way of limitation, in the figures of the accompanying drawings in which like reference numerals refer to similar elements.

DETAILED DESCRIPTION OF THE EMBODIMENT

In order to understand the technical features and practical efficacy of the present invention and to implement it in accordance with the contents of the specification, hereinafter, preferred embodiments of the present invention will be described in detail with reference to the accompanying drawings.

Figure 1:
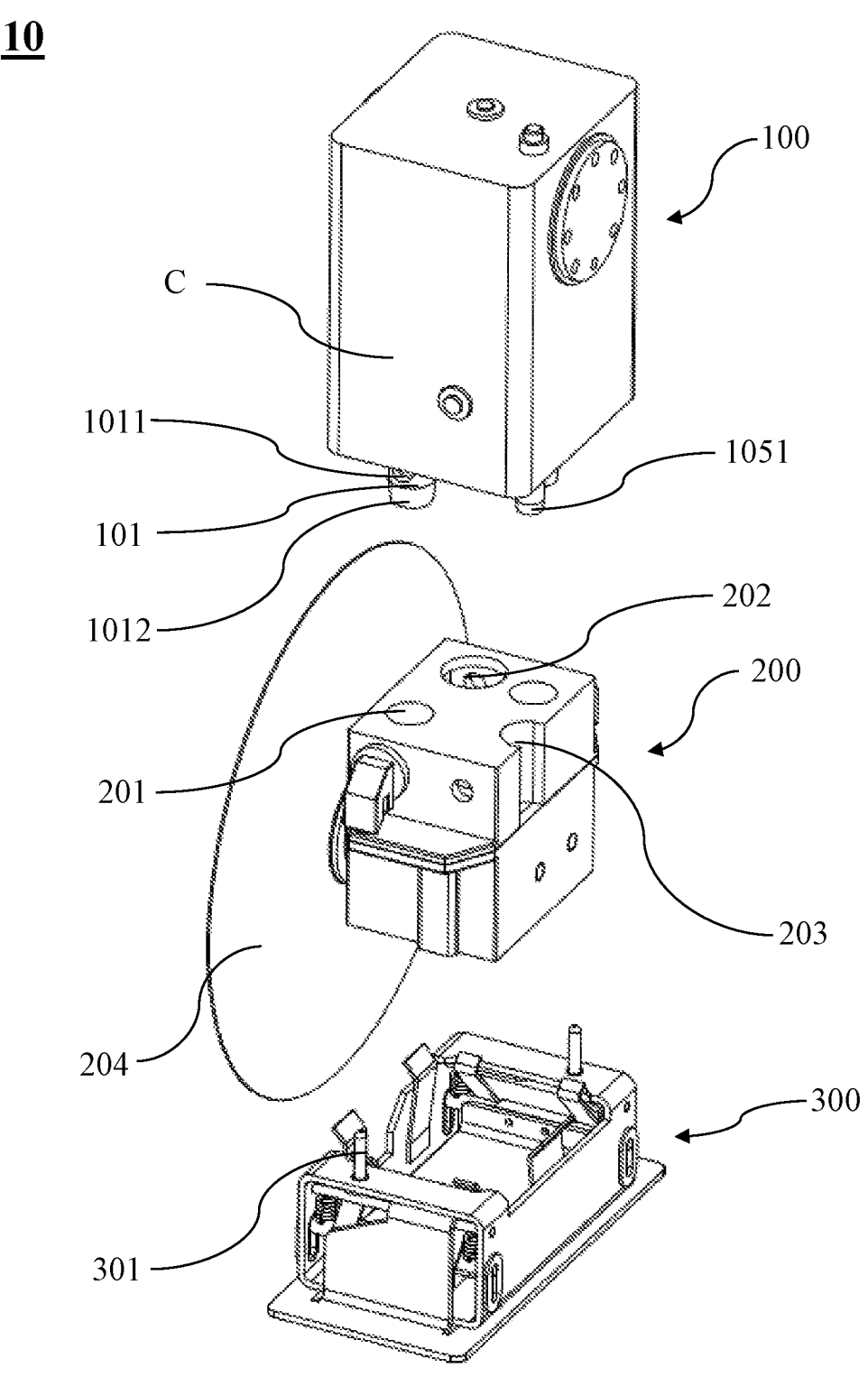
FIG. 1 is a schematic diagram of the structure of the embodiment of the tool holder of the present invention.
Figure 2:
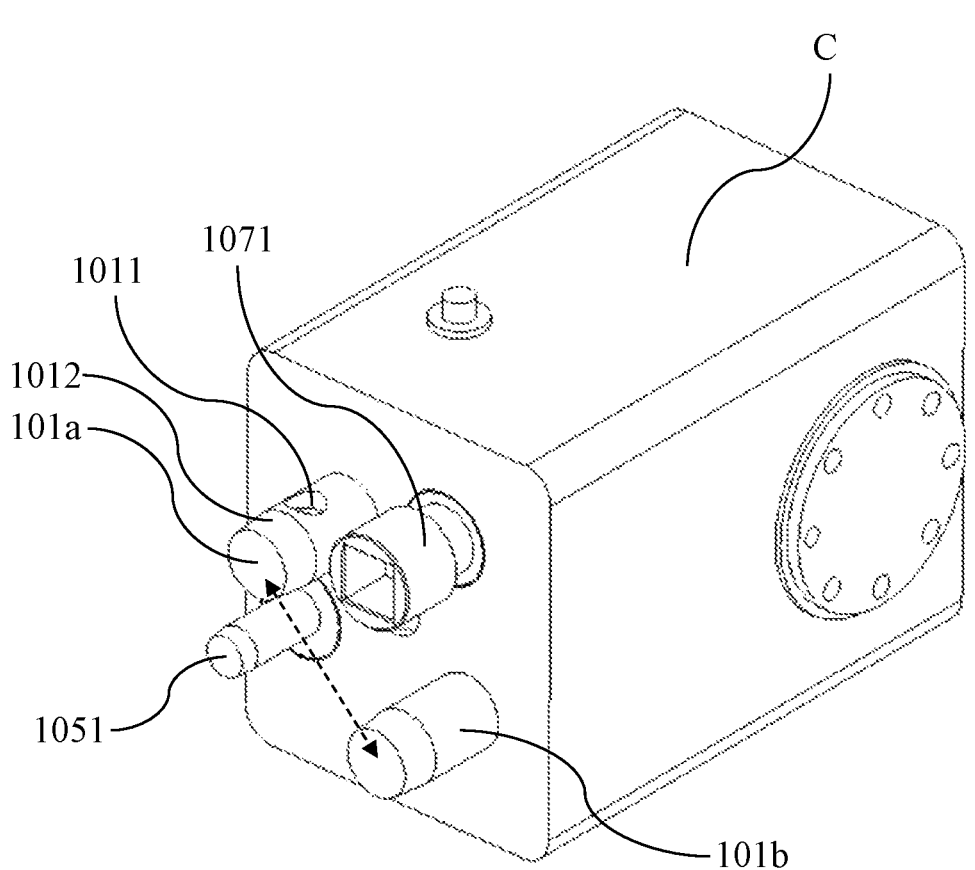
FIG. 2 is a schematic diagram of the structure of the embodiment of the holder of the present invention.
Figure 3:
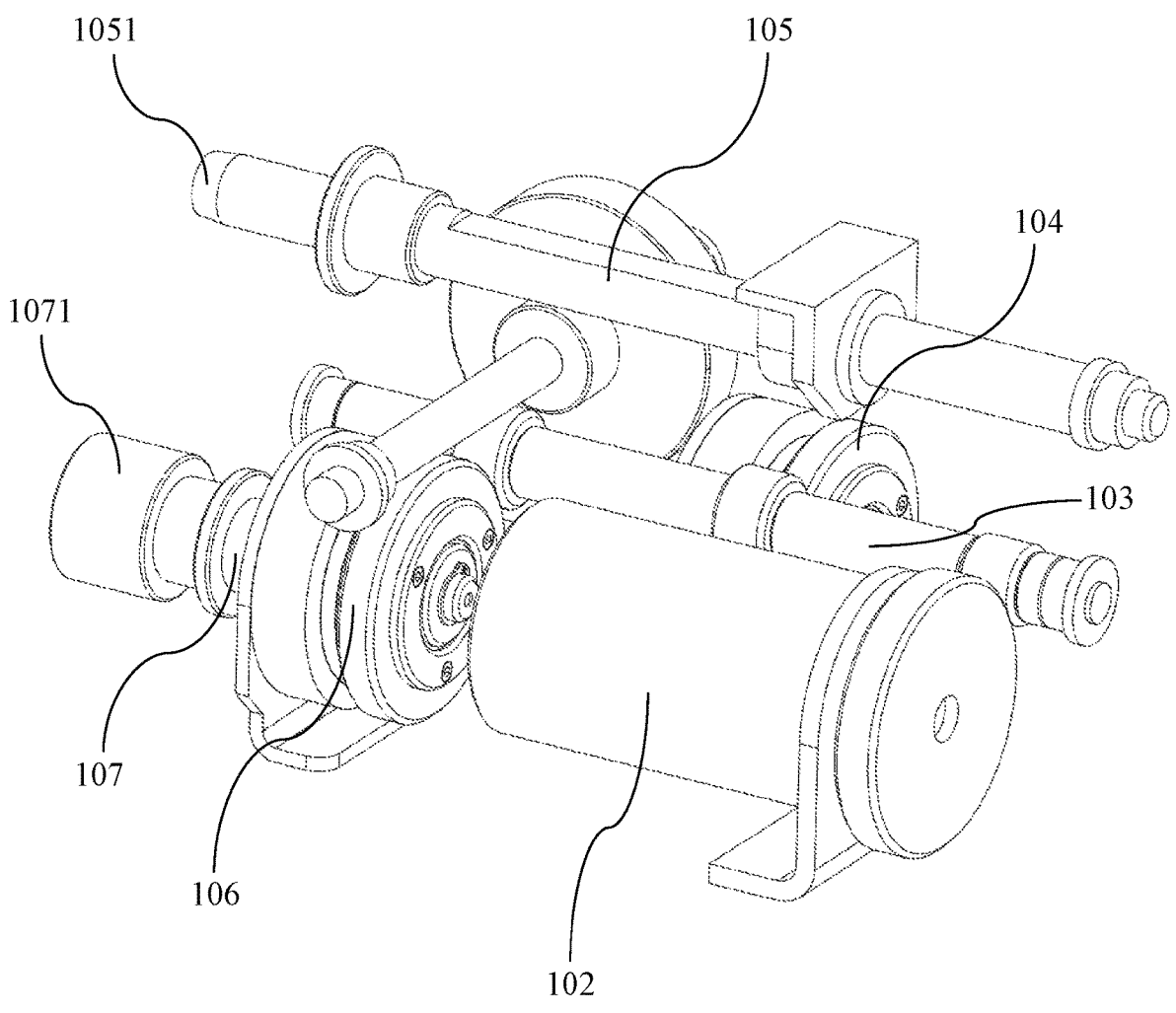
FIG. 3 is a schematic diagram of inner structure of the holder of the embodiment of the present invention.

Please refer to FIG. 1 to FIG. 3 simultaneously. FIG. 1 is a schematic diagram of the structure of the embodiment of the tool holder of the present invention. FIG. 2 is a schematic diagram of the structure of the embodiment of the holder of the present invention. FIG. 3 is a schematic diagram of inner structure of the holder of the embodiment of the present invention.

As shown in FIG. 1, the tool holder 10 of the present embodiment comprises a holder 100 and a tool end 200. The tool end 200 of the present embodiment is configured on the tool magazine 300. Specifically, the holder 100 may be the end of the independent robotic arm or output of any machine tool, the present invention is not limited thereto.

On the other hand, the tool end 200 is a multi-functional tool head which is stored in the tool magazine. For instance, please refer to FIG. 2 and FIG. 3, the holder 100 of the present embodiment comprises at least one positioning pin 101, motor 102, transmission module 103, first clutch 104, linear motion module 105, second clutch 106 and rotational motion module 107.

As illustrated in FIG. 2, the number of the positioning pin 101 of the present invention is two. Moreover, the positioning pin 101 comprises positioning pin 101a and positioning pin 101b which are configured in different places per se. Please refer to the dotted double arrow illustrated in FIG. 2, the positioning pin 101a and the positioning pin 101b are configured at the end of the holder. Preciously to say, the configuration therebetween the positioning pin 101a and the positioning pin 101b is diagonally configured on the bottom of the holder 100.

Furthermore, the motor 102 is configured in the holder 100. More specifically, after removing the casing C illustrated in FIG. 2, the inner structure of the holder 100 as shown in FIG. 3 can be clearly seen. Hence, the transmission module 103 of the present embodiment is connected with motor 102. The transmission module 103 herein is constructed by shaft(s) or gear(s). The first clutch 104 of the present embodiment detachably engages with the transmission module 103, and the second clutch 106 may detachably engages with the transmission module 103, too.

In this embodiment, the first clutch 104 and the second clutch 106 may be the clutch which may be controlled whether to engages with the transmission module 103 such as the electromagnetic clutch. In order to control the first clutch 104 and second clutch 106, in the implementable embodiment of the present invention, the first clutch 104 and the second clutch 106 may be further connected with a switch (not shown in drawings).

For instance, the above-mentioned switch may be the mechanical shaft. The switch may be actuated via the mechanical triggered displacement, therefore to switch the engagement between the transmission module 103 and the first clutch 104, the engagement between the transmission module 103 and second clutch 106, the engagement between the transmission module 103, the first clutch 104 and the second clutch 106 or the transmission module 103 detaching the first clutch 104 and second clutch 106, either.

In the same way, in the other implementable embodiment of the present invention, the switch may further connect to a controller (not shown in drawings). In other words, the controller mentioned herein is to change the control method of switch, the electronic control is used rather than the mechanical or manual trigger mechanism. The controller of this embodiment Central Processing Unit (CPU), Microprocessor Unit (MPU), Single-chip microcomputer, Programmable logic controller (PLC) or the combinations thereof, the present invention is not limited thereto.

In light of the holder 100 of the present embodiment may switch the motion modes per se, the linear motion module 105 of the present embodiment may detachably engage with the first clutch 104. Furthermore, the linear motion module 105 comprises at least one linear motion connector 1051. On the other hand, the rotational motion module 107 may detachably engage with the second clutch 106, and the rotational motion module 107 also comprises the at least one rotational connector 1071.

Of course, the tool end 200 may detachably connect to the holder 100. To satisfy the requirement of the present invention, the tool end 200 of the present embodiment comprises at least one positioning slot 201, engaged portion 202, idling portion 203 and working portion 204.

Figure 4:
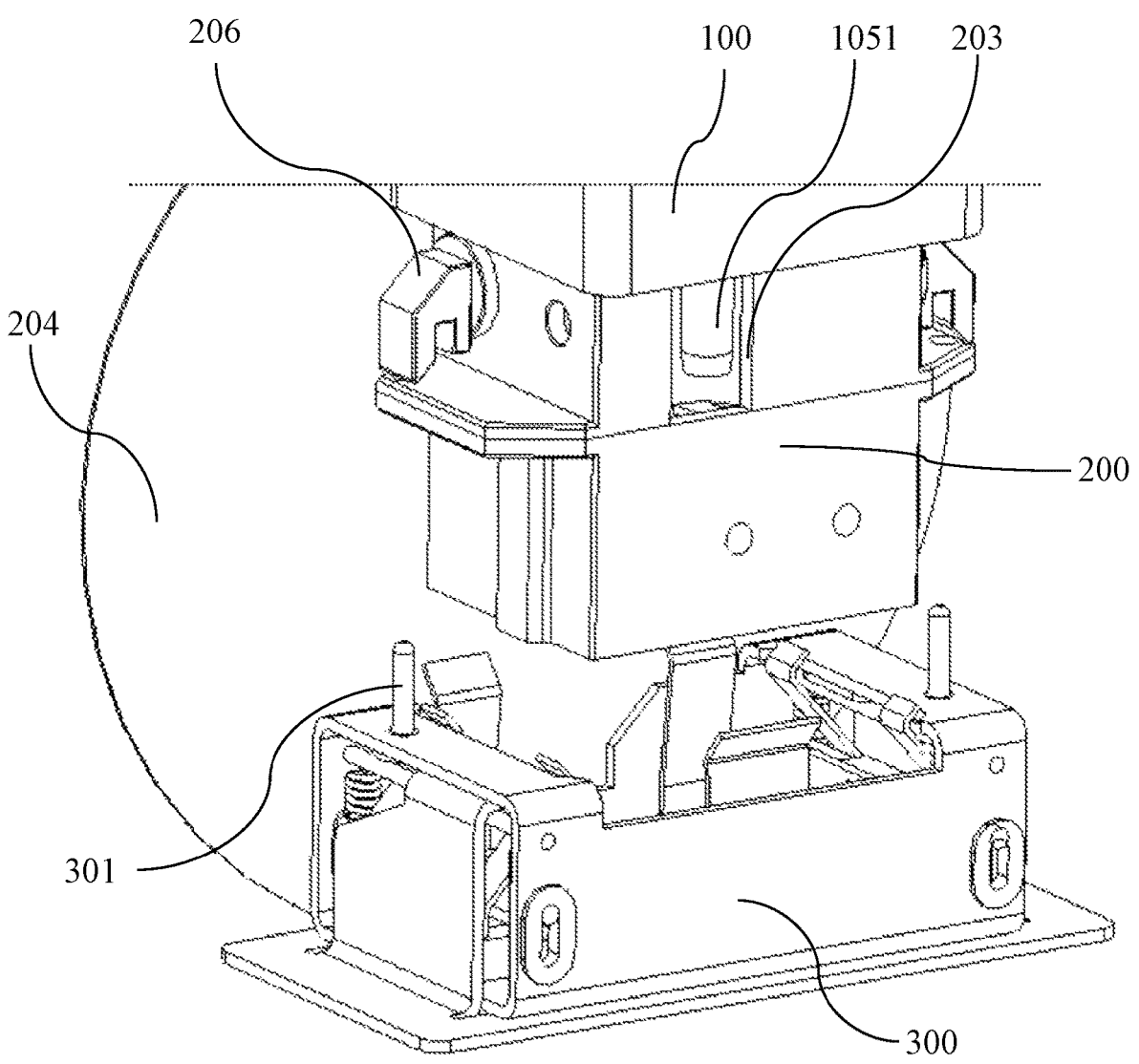
FIG. 4 is a schematic diagram of the separation between the tool end and the tool magazine of the embodiment of the present invention.
Figure 5:
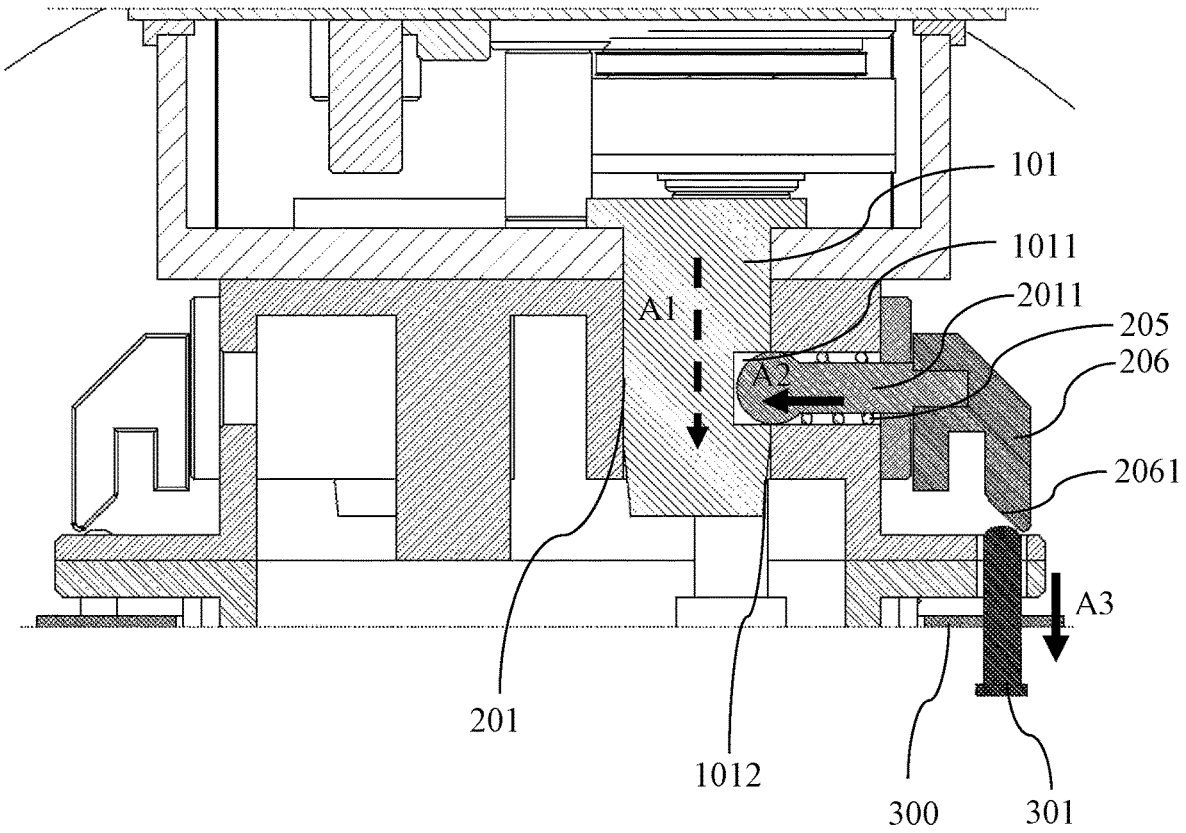
FIG. 5 is a schematic diagram of locking the tool end of the embodiment of the present invention.
Figure 6:
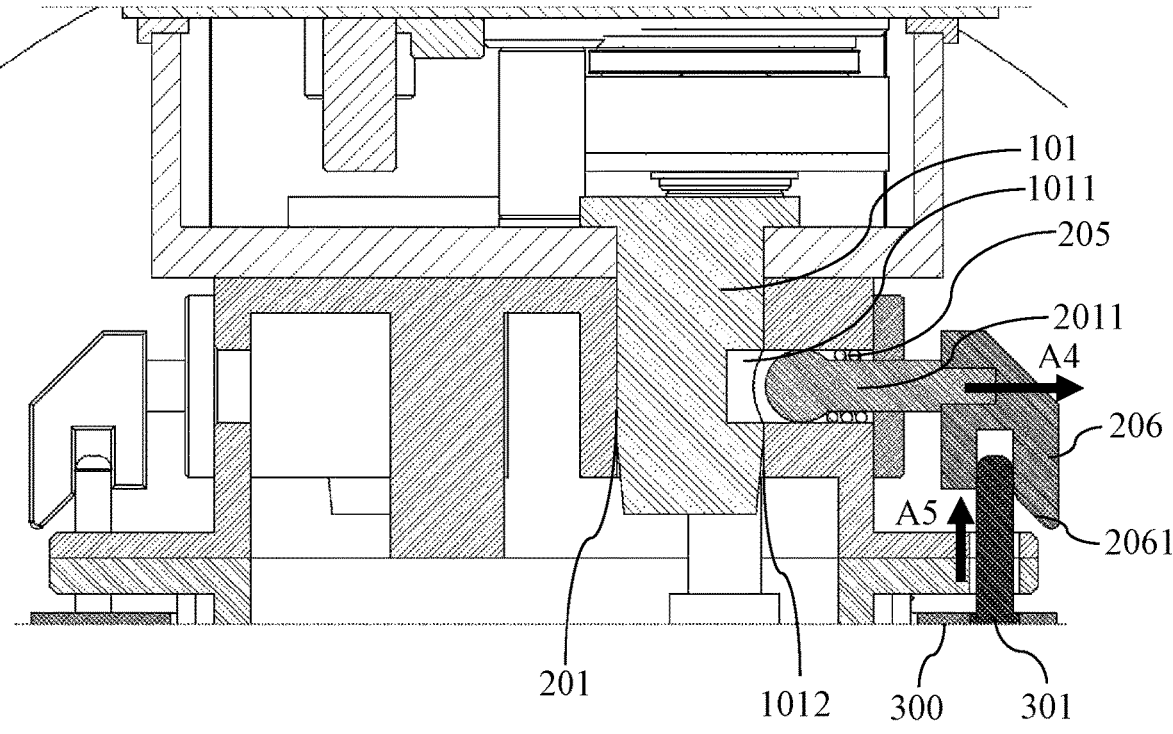
FIG. 6 is a schematic diagram of unlocking the tool end of the embodiment of the present invention.

The at least one positioning slot 201 of the present invention matches with the at least one positioning pin 101. Therefore, the group number of the positioning slot 201 and the positioning pin 101 of the present embodiment are two. In addition, please refer to FIG. 4 to FIG. 6. FIG. 4 is a schematic diagram of the separation between the tool end and the tool magazine of the embodiment of the present invention. FIG. 5 is a schematic diagram of locking the tool end of the embodiment of the present invention. FIG. 6 is a schematic diagram of unlocking the tool end of the embodiment of the present invention.

First, the embodiment illustrated in FIG. 4 is that the positioning slot 201 and the positioning pin 101 are engaged with each other, thus the holder 100 may hold the tool end 200 and make the tool end 200 leave the tool magazine 300.

The detailed engaging method between the holder 100 and the tool end 200 may refer to FIG. 5 and FIG. 6 simultaneously.

In this embodiment, a fixing hole 1011 and an engaging plane 1012 are configured on each positioning pin 101, and a fixing pin 2011 is further configured in each positioning slot 201. When every positioning pin 101 of the present embodiment enters into the positioning slot 201 in a direction as illustrated arrow 1A of FIG. 5, the engaging plane 1012 will push the fixing pin 2011 until the fixing hole 1011 and the fixing pin 2011 move to the correct position. At the same time, the elastic resetting unit 205 will automatically push the fixing pin 2011 for entering into the fixing hole 1011 along the direction of arrow A2. Therefore, the fixing pin 2011 is able to match with the fixing hole 1011 and fixed. The fixing pin 2011 is configured in the tunnel of the positioning slot 201 is simple and clear, otherwise the fixing pin 2011 of the present embodiment further connects elastic resetting unit 205 and fixing guide 206. The fixing guide 206 in this embodiment further comprises guiding plane 2061.

In such embodiment, in light of the fixing pin 2011 is designed to have bigger rounded structure configured in the head per se, the bigger rounded structure is used for the engaging with the engaging plane 1012 or the elastic resetting unit 205. In this embodiment, the elastic resetting unit 205 may be a spring. Specifically, the elastic resetting unit 205 may create a force along the arrow A2 for the fixing pin 2011 before the fixing guide 206 pulls the fixing pin 2011. Therefore, the engaging plane 1012, fixing guide 206 and elastic resetting unit 205 control the linear displacement of the fixing pin 2011, and indirectly control the fixing hole 1011 of the positioning pin 101 that is locked by the fixing pin 2011 or not.

The tool magazine 300 of the present embodiment further comprises at least one guiding pin 301. Every guiding pin 301 controls the displacement of the fixing guide 206 via the guiding plane 2061 of the fixing guide 206, therefore to make the fixing guide 206 control the displacement of fixing pin 2011. As shown in FIG. 5, when the guiding pin 301 goes downward into the tool magazine 300 along the arrow A3, the guiding pin 301 fail to contact the guiding plane 2061 of fixing guide 206. Hence, the fixing pin 2011 may be moved in the direction toward to fixing hole 1011 by the force created by the resting force of the elastic resetting unit 205 along the arrow A2 as illustrated in FIG. 5, and the fixing pin 2011 enters into the fixing hole 1011, locking the positioning pin 101 and making the holder 100 holds the tool end 200.

However, when the guiding pin 301 raises along the arrow A5 as illustrated in FIG. 6, the guiding pin 301 may engages with the guiding plane 2061, therefore to trigger that the fixing guide 206 may move the fixing pin 2011 along the arrow A4 as illustrated in FIG. 6. Hence, the fixing pin 2011 may have a force for resisting the force created by the elastic resetting unit 205 and leave the fixing hole 1011, separating the holder 100 and the tool end 200 therebetween.

Therefore, the mechanism illustrated in FIG. 5 and FIG. 6 may be helpful for realizing how the holder 100 and tool end 200 of the present embodiment may be hold or detached quickly. On the other hand, the holder 100 may satisfy different tasks of tool end 200 because the holder 100 comprises linear motion module 105 and rotational motion module 107 simultaneously.

The engaged portion 202 of the present embodiment may alternatively engage with the linear motion connector 1051 or the rotational connector 1071, due to the type of tool end 200. At the same time, the linear motion connector 1051 or rotational connector 1071 which is not engaged with the engaged portion 202 will be hold by the idling portion 203 which is provided by the present embodiment.

The working portion 204 of the present embodiment is required to receive the force transmitted from the linear motion connector 1051 or rotational connector 1071, thus the working portion 204 is connected with the engaged portion 202. Specifically, the working portion 204 of the present embodiment is disc saw, thus to need the rotational force provided by the rotational connector 1071. In the embodiment illustrated in FIG. 1 to FIG. 4, the rotational connector 1071 is connected with the engaged portion 202, and the linear motion connector 1051 is hold in the idling portion 203.

Figure 7:
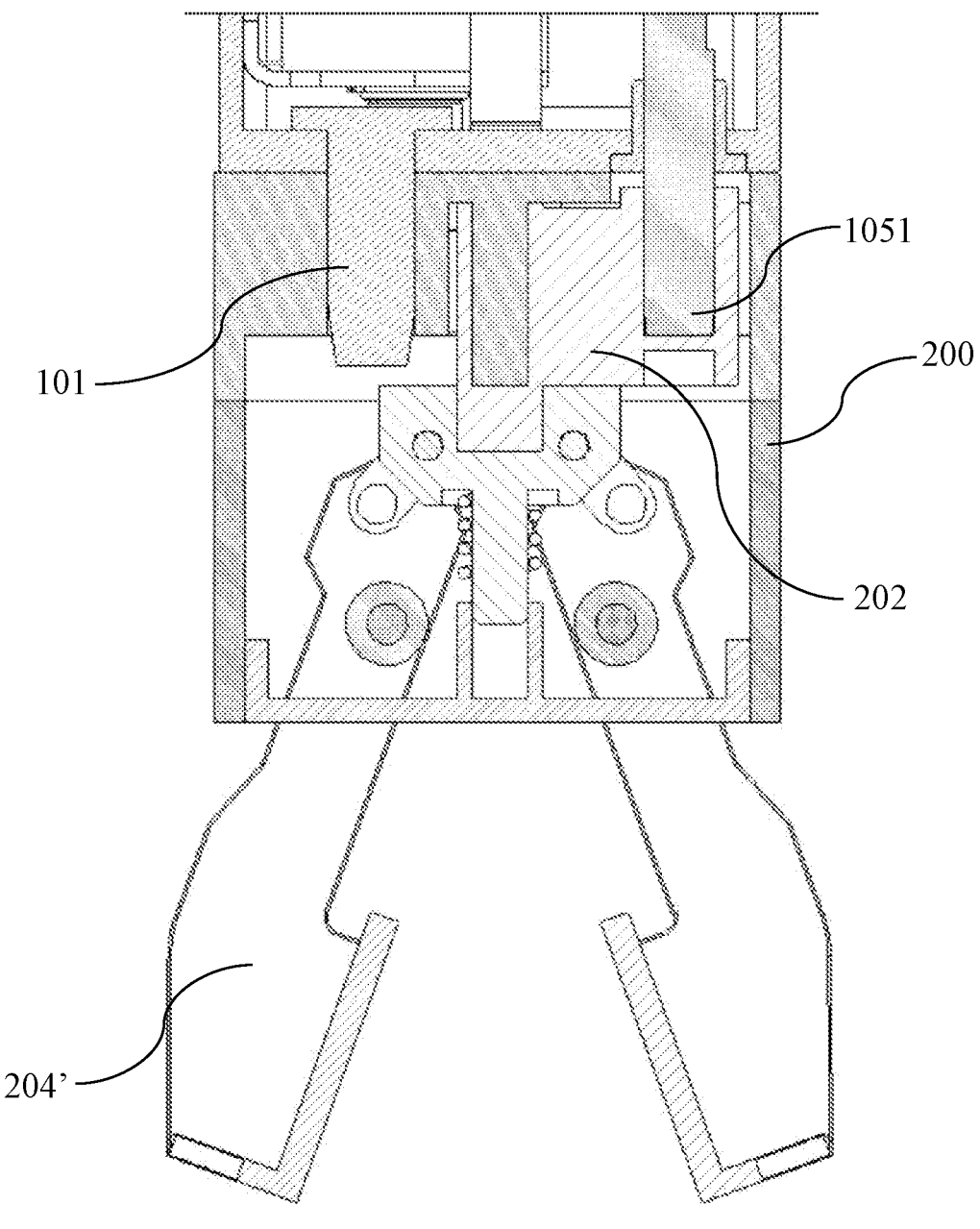
FIG. 7 is a schematic diagram of the connection structure of the working portion of another embodiment of the present invention.

As shown in FIG. 7, FIG. 7 is a schematic diagram of the connection structure of the working portion of another embodiment of the present invention. In light of the working portion 204' is a claw. The claw clearly needs the linear force for actuating. Therefore, in the embodiment of FIG. 7, the linear motion connector 1051 engages with the engaged portion 202, and the rotational connector 1071 is hold in the idling portion 203.

No matter the embodiments illustrated in FIG. 1 to FIG. 4 or FIG. 7, if there is any tool end 200 needs the liner and rotational force simultaneously, the tool end 200 may also be designed not to comprise any idling portion 203, instead comprising two engaged portions 202, the present invention is not limited thereto.

Figure 8:
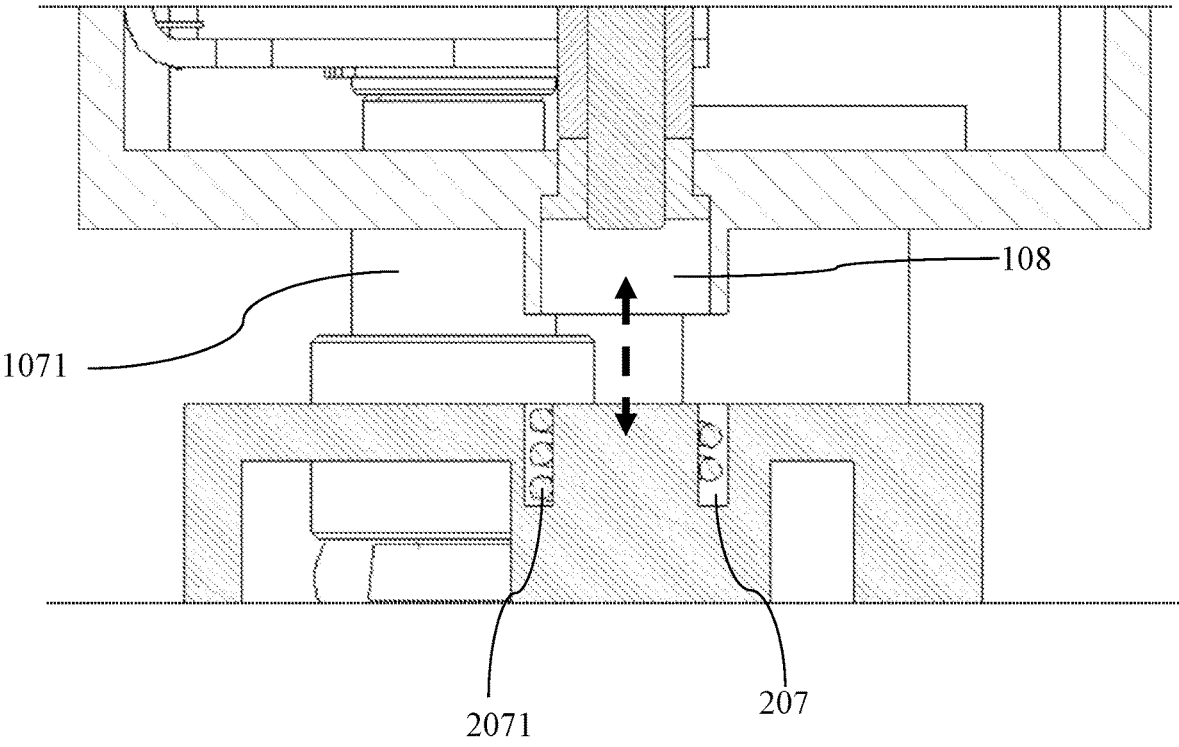
FIG. 8 is a schematic diagram of structure of the separation assisting connector and the separation assisting receiver of the other embodiment of the present invention.

Please refer to FIG. 8, FIG. 8 is a schematic diagram of structure of the separation assisting connector and the separation assisting receiver of the other embodiment of the present invention. The embodiment illustrated in FIG. 8 shows an additional structure which may accelerate the separation speed between the holder 100 and the tool end 200. The holder 100 of the embodiment illustrated in FIG. 8 further comprises separation assisting connector 108, and the tool end 200 therein further comprises separation assisting receiver 207.

In the embodiment of FIG. 8, the separation assisting receiver 207 further comprises elastic assisting unit 2071. The separation assisting connector 108 detachably connects to the separation assisting receiver 207 via elastic assisting unit 2071. Therefore, the separation assisting connector 108 and separation assisting receiver 207 are designed to match with each other in male and female head form. When the holding force created by the positioning pin 101 has been disappeared, the elastic assisting unit 2071 (the spring) may automatically push the separation assisting connector 108 and eject the separation assisting connector 108 out of the separation assisting receiver 207, resulting in the quick and automatic separation between the holder 100 and tool end 200.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What the claim is:

1. A tool holder, comprising:
  a holder, comprising:

at least one positioning pin, configured on end of the holder;
    a motor, configured in the holder;
    a transmission module, connected with the motor;
    a first clutch, detachably engaged with the transmission module;
    a linear motion module, detachably connected with the first clutch, and the linear motion module comprises at least one linear motion connector;
    a second clutch, detachably engaged with the transmission module;
    a rotational motion module, detachably engaged with the second clutch, and the rotational motion module comprises at least one rotational connector;
  a tool end, detachably connected with the holder, the tool end comprises:
    at least one positioning slot, matched with the at least one positioning pin;
    an engaged portion, alternatively connected with the at least one linear motion connector or the at least one rotational connector;
    an idling portion, alternatively holding the at least one linear motion connector or the at least one rotational connector which has not been connected with the engaged portion; and
    a working portion, connected with the engaged portion.

2. The tool holder as claimed in claim 1, wherein the tool end further detachably connected with a tool connected with a tool magazine.

3. The tool holder as claimed in claim 2, wherein a fixing hole and an engaging plane are further configured on each of the at least one positioning pin, and each of the at least one positioning slot further comprises a fixing pin; wherein each of the at least one positioning pin enters each of the at least one positioning slot, the engaging plane actuates fixing pin and makes the fixing hole matches with the fixing pin.

4. The tool holder as claimed in claim 3, wherein an elastic resetting unit and a fixing guide are further connected with the fixing pin.

5. The tool holder as claimed in claim 4, wherein the fixing guide further comprises a guiding plane, and at least one guiding pin is further configured on the tool magazine; wherein each of the at least one guiding pin controls displacement of the fixing guide via the guiding plane, and the fixing guide actuates displacement of the fixing pin.

6. The tool holder as claimed in claim 1, wherein number of the at least one positioning pin is two.

7. The tool holder as claimed in claim 6, wherein shape of bottom of the holder is rectangle, and the at least one positioning pin are configured on the bottom of the holder diagonally.

8. The tool holder as claimed in claim 1, wherein the first clutch and the second clutch further connect to a switch.

9. The tool holder as claimed in claim 1, wherein the switch further connects to a controller.

10. The tool holder as claimed in claim 9, wherein the controller comprises Central Processing Unit (CPU), Microprocessor Unit (MPU), Single-chip microcomputer, Programmable logic controller (PLC) or combinations thereof.

11. The tool holder as claimed in claim 9, wherein the controller is a shaft.

12. The tool holder as claimed in claim 1, wherein the holder further comprises a separation assisting connector, and the tool end further comprises a separation assisting receiver; wherein the separation assisting receiver further comprises an elastic assisting unit; wherein the separation assisting connector detachably connects to the separation assisting receiver via the elastic assisting unit.

\* \* \* \* \*